UNITED STATES PATENT OFFICE.

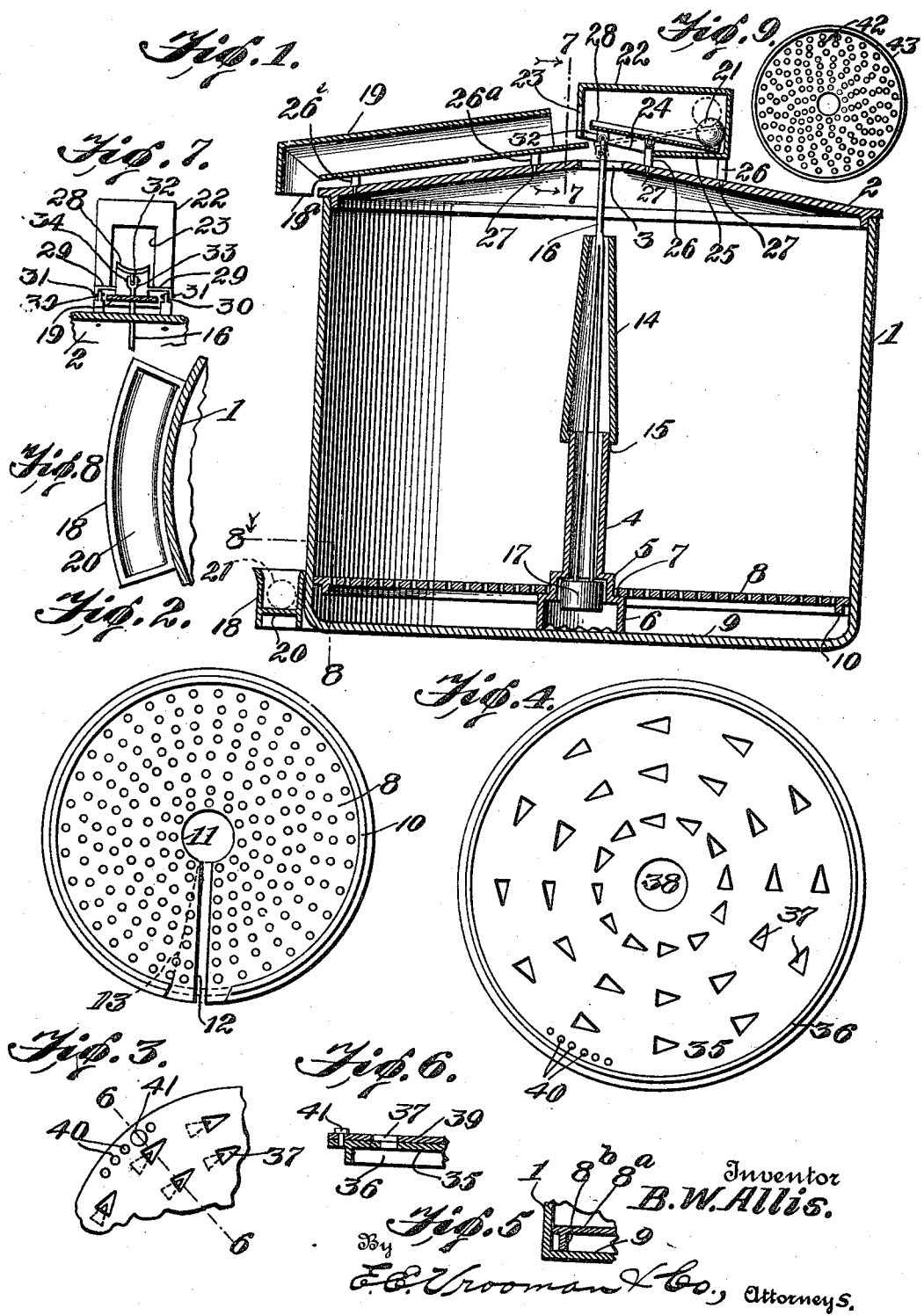

BURTON W. ALLIS, OF GARNETT, KANSAS.

COOKING APPARATUS.

1,318,308.  Specification of Letters Patent.  Patented Oct. 7, 1919.

Application filed December 12, 1918. Serial No. 266,474.

*To all whom it may concern:*

Be it known that I, BURTON W. ALLIS, a citizen of the United States, residing at Garnett, in the county of Anderson and State of Kansas, have invented certain new and useful Improvements in Cooking Apparatus, of which the following is a specification, reference being had therein to the accompanying drawings.

This invention relates to a cooking apparatus, and more particularly to a sounding device and an adjustable false bottom therefor.

An object of the invention is the production of simple and efficient means for supporting the articles to be cooked in the kettle away from the bottom of the kettle, so as to prevent the materials or foods from being burned, and thereby produce an obnoxious action upon the metal from which the kettle is formed.

Another object of the invention is the production of a simple and efficient means for producing a detachable bottom which may be adjusted to suit the different sizes or forms of kettles or receptacles.

A further object of the invention is the production of an efficient and comparatively simple sounding device for warning the cook or operator when the liquid in the receptacle is low and liability of burning the food is imminent.

With these and other objects in view this invention consists of certain novel combinations, constructions, and arrangements of parts as will be hereinafter fully described and claimed.

In the accompanying drawing:

Figure 1 is a vertical sectional view through a kettle, showing the invention applied thereto.

Fig. 2 is a bottom plan view of the detachable bottom.

Fig. 3 is a fragmentary top plan view of another embodiment of the bottom.

Fig. 4 is a bottom plan view of another embodiment of the detachable or false bottom used in connection with the present invention.

Fig. 5 is a vertical sectional view through a portion of the kettle showing the draining plate and flange formed in one piece.

Fig. 6 is a sectional view taken on line 6—6, Fig. 3.

Fig. 7 is a sectional view taken on line 7—7, Fig. 1, and looking in the direction of the arrows.

Fig. 8 is a sectional view taken on line 8—8, Fig. 1, and looking in the direction of the arrow.

Fig. 9 is an inverted plan view of a disk or bottom formed in one piece.

Referring to the drawings by numerals, 1 designates the kettle or receptacle provided with a detachable top or cover 2, which has a central opening 3.

The primary hollow standard 4 is provided with a plurality of enlarged portions 5 and 6 (Fig. 1) producing a shoulder 7 upon which normally rests the false or detachable bottom 8. This bottom 8 is provided with a plurality of apertures allowing the water or liquid to pass therethrough, and upon this bottom 8 the materials, or foods to be cooked, rest and thereby prevents the materials or food from coming in direct contact with the bottom 9 of the receptacle 1.

The detachable or false bottom 8 is provided on its under face with an annular flange 10, and the bottom is also provided with the central aperture 11 that surrounds the enlarged portion 5 of the standard 4, and this bottom 8 is split, as at 12, so that the bottom 8 can have its split ends overlapped, as indicated by dotted lines 13 to accommodate the bottom to different size receptacles.

An auxiliary extension or standard 14 is mounted at 15 upon the upper end of primary standard 4, which extension 14 acts as a guard for substantially the entire length of the stem 16, preventing the foods from coming in direct contact with the stem, which coming in contact would necessarily interfere with the efficiency of the device. The stem 16 is solid at its top but is split, as clearly shown in Fig. 1, so that the lower split ends will engage different parts of the float 17 to make the connection with the float more stable, yet by the split construction of the stem a light, yet efficient stem is produced. The float 17 moves freely within the enlarged portions 5 and 6 of the standard 4, and is guided in its movement by the inner walls of the extension 5.

A curved catch pan 18 (Figs. 1 and 8) is placed against the side of the receptacle directly under the guiding chute 19 (Fig. 1) and the catch pan is provided with a bottom 20 which is above the support or floor, so that when the sphere or marble 21 drops in the catch pan 18 considerable noise will be created, thereby warning the cook or operator of the apparatus that the water in the receptacle is low or exhausted; this exhaustion of the liquid under the detachable or false bottom 8 causes the float 17 to drop, and thereby causing the sphere 21 to be discharged into the catch or sounding pan 18, as will be hereinafter specifically described.

It will be noted that the enlarged extension 6 of the standard 4 has its lower edge scalloped or notched to allow the liquid in the receptacle to freely pass up into the standard 4, so that the float 17 can normally be held up against the top face of the interior of the enlarged portion 5 of the standard 4, thereby preventing the sphere or marble 21 (Fig. 1) from being discharged into the guiding chute 19, but when the water drops low or is exhausted from the receptacle 1 the sphere will be discharged into the chute and thence into the catch or sounding pan 18, thereby giving the cook or chef notice that the receptacle 1 needs immediate attention for preventing burning or scorching of the contents thereof.

The housing 22 is provided with a closed rear end and with an opening 23 in its front or inner end, and with part of the bottom open as shown at 24 (Fig. 1). Secured (by solder or the like) to the solid bottom 25 of the housing 22 are four vertical posts 26, each post having a lower reduced end 27, which reduced end 27 extends through an aperture in the top or cover 2 of receptacle 1, thereby retaining the housing in a detachable position upon the top or cover 2.

The tilting trap 28 is transversely curved (Fig. 7) to positively hold the sphere 21 thereon, until the trap 28 is tilted, as shown by dotted lines in Fig. 1, when the sphere will be quickly directed into the guide chute 19. The tilting trap 28 is provided (Fig. 7) with a pair of outwardly-extending integral extensions 29, each extension having at its outer end a downwardly-extending apertured extension 30, and pins 31 extend through the top of the central posts 26 attached to the housing 22. It will, therefore, be seen that the tilting trap has a pivotal connection upon the central posts of the housing, and on the bottom of the trap and near the front end is an apertured lug 32, which lug 32 fits into the bifurcated end 33 of the stem 16, and a pin or rivet 34 extends through the lug 32 and the bifurcated end 33 of the stem, pivotally connecting the same together, so that when the float 17 is in position shown in Fig. 1, the sphere 21 will be held in its inactive position, as shown, but when the liquid drops in the receptacle or is exhausted, the float 17 will drop causing the tilting trap to move to the position shown in dotted lines in Fig. 1, thereby rolling the sphere into the chute 19 and thence into the sounding or catch pan 18.

The guiding chute is provided with posts 26ᵃ of the same construction as post 26 so that the guiding chute is detachably mounted upon the top or cover 2. The chute is provided with a downwardly-extending portion 19ᵃ that directs the sphere or marble positively into the catch or sounding pan 18.

It will be noted that I have produced a very sanitary cooking apparatus, since the catch or sounding pan 18 is readily detachable from the receptacle 1 and the same is true of the guiding chute 19, and by removing the pin 34 the housing 22 and its associated parts can also be removed from the cooker, since the extensions 27 of the posts 26 are readily removed from the apertures in the cover. After removing the parts the entire apparatus can be thoroughly cleaned and quickly assembled.

I have shown in Fig. 9 a solid disk-like bottom that may be used, when desired, in place of the adjustable bottom 8.

In Fig. 4, there is shown an embodiment of invention wherein a bottom plate 35 is employed, having a circumferential flange 36 formed near the periphery thereof upon the under face. A plurality of V-shaped or diamond-shaped notches 37 are formed in the plate 35 to permit water to easily pass through the plate, and a centrally located aperture 38 is formed in the plate to permit the standard 4 to pass therethrough, for the purpose of supporting the plate 35. Upon the plate 35 is mounted an auxiliary plate 39 (Fig. 6) which has similar apertures to 37 and a central aperture like 38, and in the plates 35 and 39 are apertures 40 which are adapted to register, and by placing a pin or locking member 41 in the registering apertures of plates 35 and 39, the plates can be retained in an adjusted position, whereby the size of the openings caused by the apertures 37 registering can be controlled, as clearly indicated in Figs. 3 and 6.

In Fig. 5 the false bottom 8ᵃ is shown provided with a comparatively long annular flange 8ᵇ, whereby the outer edges of the bottom 8 are supported directly upon the bottom 9 of the kettle or receptacle 1.

In Fig. 9 the bottom is provided with apertures 42 and with an annular marginal flange 43 formed on its under face.

I wish it to be understood that I reserve the right to make such modifications and alterations in the construction of my apparatus as shall appear to one skilled in the art to which this invention relates, and which modifications or alterations shall fairly fall within the scope of the appended claims.

What I claim is:

1. In an apparatus of the class described, the combination, with a receptacle provided with a cover, of a sounding pan at one side of said receptacle, a sphere containing housing on said cover, a guiding chute on said cover contiguous to said housing and being adapted to direct a sphere into said sounding pan, and means in said receptacle for actuating the sphere in the housing for causing the same to be discharged into said chute and thence into said sounding pan.

2. In an apparatus of the class described, the combination, with a receptacle provided with a cover, of a housing on said cover, a tilting trap in said housing, float control means attached to said trap for actuating the same when the liquid in the receptacle is exhausted or lowered, a sphere carried by said trap, and means carried by said cover for receiving the sphere for directing the same to one side of said receptacle when the float means is operated and the trap tilted.

3. In an apparatus of the class described, the combination, with a receptacle having a detachable cover, of a detachable housing and a detachable chute mounted upon said cover, a detachable catch pan at one side of said receptacle, sphere holding means in said housing, and float means connected to said sphere holding means and being adapted to operate said sphere holding means by the condition of liquid in the receptacle for discharging a sphere into said chute and thence into said catch pan.

4. In an apparatus of the class described, the combination, with a receptacle provided with a cover, of a detachable chute provided with a plurality of posts, each post having a reduced extension, each extension extending into the cover, sphere-supporting means contiguous to said chute, and means for operating said sphere-supporting means for directing a sphere into said chute.

5. In an apparatus of the class described, the combination, with a receptacle having a cover, of a housing provided with an open end and a partially open bottom, said housing provided with a plurality of posts connected thereto, some of said posts provided with apertured upper ends, a tilting trap curved in cross section and provided with oppositely extending extensions, each extension provided with an apertured depending extension, said apertured depending extensions registering with the apertures in said posts, pins in the apertures of the posts and depending extensions, thereby pivotally connecting the trap to the posts, said trap provided near its outer end and on its under face with an apertured lug, a stem provided with an upper bifurcated end, said lug extending into said bifurcated end, a pin connecting said lug and bifurcated end, a float connected to said stem, said posts provided with extensions on their lower ends extending into said cover, a sphere normally supported upon said trap, and means carried by said cover for receiving said sphere and directing the same to one side of the receptacle when said float is actuated.

6. In an apparatus of the class described, the combination, with a receptacle, of a cover having an inclined surface carried by said receptacle, a chute detachably supported upon and parallel with said inclined surface of said cover, and float actuated sphere supporting means positioned contiguous to the upper end of the chute whereby a sphere can be discharged into said chute and thence discharged to one side of said receptacle.

7. In an apparatus of the class described, the combination, with a receptacle provided with a cover, of a tilting trap supported upon said cover, a stem pivotally connected to said trap and provided with a split lower end, a float connected to said split lower end, and a chute contiguous to said trap and being adapted to receive a sphere from said trap and direct the sphere to one side of said receptacle.

8. In an apparatus of the class described, the combination, with a receptacle provided with a removable cover, said cover having a central aperture, of a housing detachably mounted upon the cover to one side of said aperture and overhanging the same, a chute detachably mounted upon said cover and having its inner end overhanging the aperture and positioned also under a part of the housing, a float actuated holding means in said housing and adapted to register with the inner end of the chute for discharging a sphere on to said chute, and sounding means at one side of the receptacle and near the chute for receiving the sphere when discharged from the chute.

9. In an apparatus of the class described, the combination, with a receptacle, of a hollow standard in said receptacle provided with a plurality of enlarged portions at its lower end, a float movably mounted in the enlarged portions of said standard and guided by the inner face of one of the enlarged portions, a detachable bottom mounted upon said enlarged portions of the stem, sphere supporting means carried by the cover, and means connecting the float to said sphere supporting means whereby when the float moves within the enlarged portions of the standard, the sphere supporting means will be actuated.

10. In an apparatus of the class described, the combination, with a receptacle provided with a cover, of a sectional standard in said receptacle, the lower portion of said standard provided with a pair of enlarged portions of different sizes, a detachable bottom resting upon one of the enlarged portions, a float in the enlarged portion and limited in its upward movement by one of the enlarged portions of the standard, sphere holding means upon said cover, and a stem connected to said sphere holding means and to said float, said stem being protected throughout a part of its length by said standard.

11. In an apparatus of the class described, the combination, with a receptacle, of a standard provided with a plurality of enlarged portions at its lower end, a bottom supported upon the lower enlarged portion of the standard, a float within the enlarged portions of the standard and limited in its upward movement by the upper enlarged portion thereof, a sphere trap, and a stem connected to said sphere trap and to said float within the standard whereby when the float is operated within the enlarged portion of the standard, the sphere trap will be actuated for releasing a sphere for indicating purposes.

12. In an apparatus of the class described, the combination, with a receptacle, of a standard in said receptacle, a detachable bottom supported upon said standard, and an alarm device associated with said standard and receptacle for sounding an alarm when liquid in the receptacle is partly or entirely exhausted.

In testimony whereof I hereunto affix my signature.

BURTON W. ALLIS.

Copies of this patent may be obtained for five cents each, by addressing the "Commissioner of Patents, Washington, D. C."